E. W. STROHN.
HEATING VESSEL.
APPLICATION FILED NOV. 23, 1908.
952,690.
Patented Mar. 22, 1910.
2 SHEETS—SHEET 1.
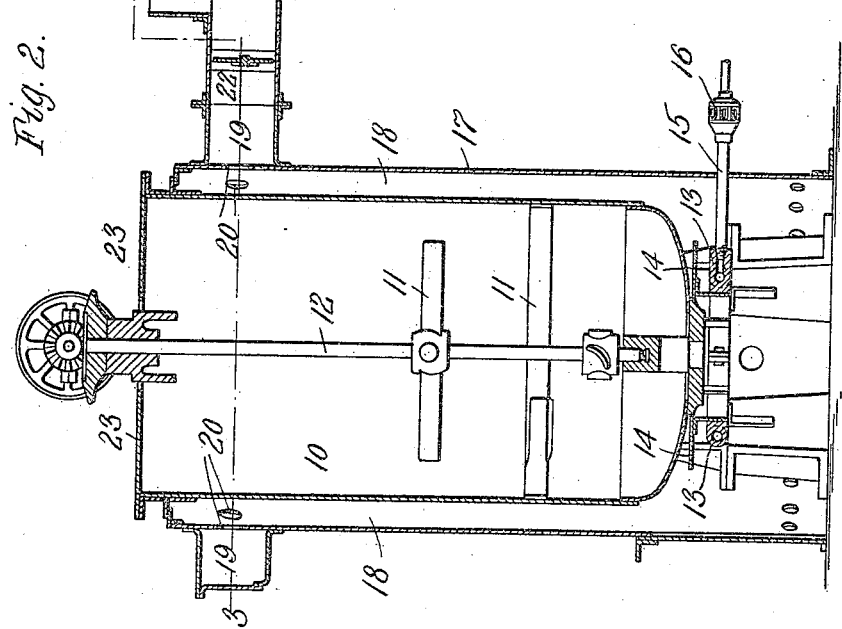
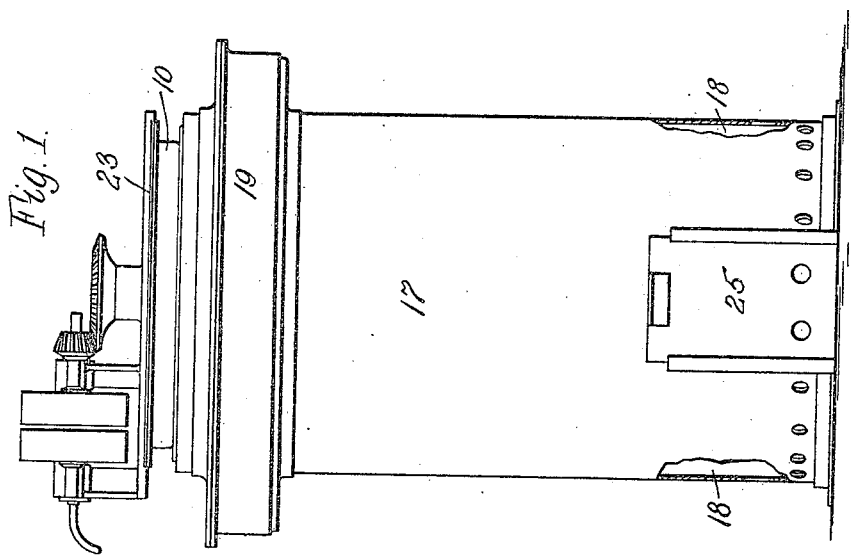
Witnesses:
A. G. Dimond.
E. A. Volk.
Inventor.
Emil Wilhelm Strohn,
By Wilhelm, Parker & Hard
Attorneys.

E. W. STROHN.
HEATING VESSEL.
APPLICATION FILED NOV. 23, 1908.

952,690.

Patented Mar. 22, 1910.
2 SHEETS—SHEET 2.

UNITED STATES PATENT OFFICE.

EMIL WILHELM STROHN, OF BUFFALO, NEW YORK.

HEATING VESSEL.

952,690.  Specification of Letters Patent.  Patented Mar. 22, 1910.

Application filed November 23, 1908. Serial No. 464,174.

*To all whom it may concern:*

Be it known that I, EMIL WILHELM STROHN, a subject of the German Emperor, residing at Buffalo, in the county of Erie and State of New York, have invented a new and useful Improvement in Heating Vessels, of which the following is a specification.

This invention relates to heating vessels, tanks or kettles which are employed for heating liquids or for melting or liquefying solid or semi-solid substances, for instance, insulating compounds, and which comprise an upright vessel, tank or kettle, a gas burner below the same, and a jacket or case which incloses the vessel and burner and conducts the hot gases from the burner upwardly along the vessel and is connected at its upper end by a pipe or flue with the chimney.

The object of this invention is to so construct the apparatus that the hot gases are uniformly distributed around the vessel and a uniform heating of the contents is effected.

Figure 3:
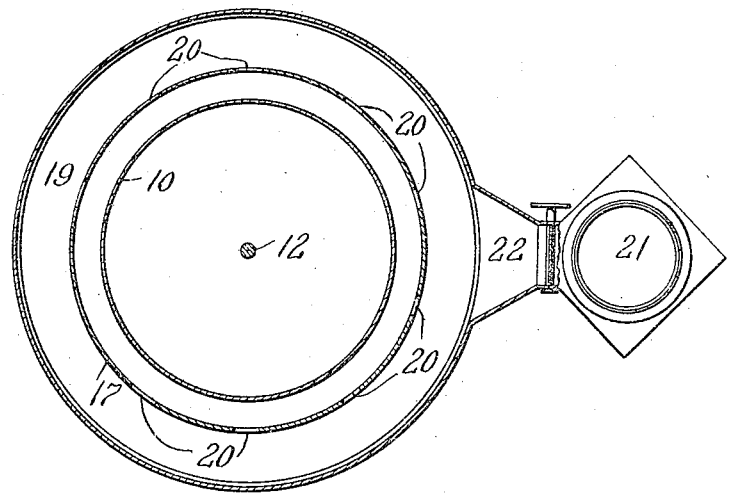
Figure 4:
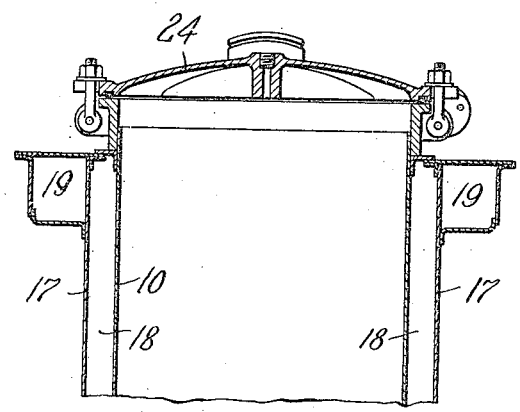

In the accompanying drawings, consisting of two sheets: Figure 1 is an elevation of a heating apparatus embodying this invention. Fig. 2 is a sectional elevation of the same at right angles to Fig. 1. Fig. 3 is a horizontal section in line 3—3, Fig. 2. Fig. 4 is a sectional elevation, showing a modified construction of the top portion of the vessel.

Like reference characters refer to like parts in the several figures.

10 represents the heating vessel, tank or kettle which is open at the top and closed at the bottom and which has preferably a body of cylindrical form. This vessel is preferably provided with stirrers 11 secured to a vertical shaft 12 which is driven by any suitable means.

13 represents the gas burner, preferably of annular form, arranged underneath the bottom of the vessel, which latter may be protected by a baffle 14 interposed between the burner and the vessel, as shown in Fig. 2.

15 represents the gas pipe leading to the burner and provided with an air mixer 16.

17 represents the jacket or case which surrounds the vessel and burner and is separated from the vessel by an annular passage 18 through which the hot gases flow upwardly from the burner. This jacket is closed at its upper end and is surrounded near its upper end by an annular equalizing chamber 19 which communicates with the interior of the jacket by an annular series of openings 20 and with the chimney 21 by an escape pipe 22. The draft of the chimney is applied primarily to the equalizing chamber and the latter distributes the draft through the annular series of openings 20 around the jacket and vessel, whereby the heat generated by the gas burner is distributed around the vessel and a practically uniform heating effect is produced on the contents. The openings 20 may be made of gradually increasing size as their distance from the exit increases.

When the vessel is used under atmospheric pressure it can be left open at the top or can be covered by plates 23, as represented in Figs. 1 and 2. When the vessel is used for operating upon the contents in a vacuum or under pressure it is closed tightly at the top by a cover 24, as represented in Fig. 4.

25 represents a sliding door of ordinary construction for affording access to the burner.

I claim as my invention:

1. The combination with a heating vessel, a fluid burner arranged underneath the same, and a jacket surrounding said vessel and burner and spaced from said vessel to form an annular passage, of an annular equalizing chamber which surrounds the upper portion of said passage and communicates therewith at different points circumferentially, and an escape passage connecting with said chamber, substantially as set forth.

2. The combination with a heating vessel, a fluid burner arranged underneath the same, and a jacket surrounding said vessel and burner and spaced from said vessel to form an annular passage and provided near its upper end with an annular series of openings, of an equalizing chamber arranged around said jacket outside of said openings, and an escape passage communicating with said chamber, substantially as set forth.

Witness my hand in the presence of two subscribing witnesses.

EMIL WILHELM STROHN.

Witnesses:
 EDWARD WILHELM,
 C. B. HORNBECK.